US007764276B2

(12) United States Patent  
Schermerhorn

(10) Patent No.: US 7,764,276 B2  
(45) Date of Patent: Jul. 27, 2010

(54) TOUCH CONTROL SYSTEM AND APPARATUS WITH MULTIPLE ACOUSTIC COUPLED SUBSTRATES

(76) Inventor: Jerry D. Schermerhorn, 4779 Genoa Rd., Perrysburg, OH (US) 43551

( * ) Notice: Subject to any disclaimer, the term of this patent is extended or adjusted under 35 U.S.C. 154(b) by 1135 days.

(21) Appl. No.: 11/405,775

(22) Filed: Apr. 18, 2006

(65) Prior Publication Data

US 2007/0240913 A1  Oct. 18, 2007

(51) Int. Cl.  
*G06F 3/043* (2006.01)
(52) U.S. Cl. ............... 345/177; 345/175; 178/18.01; 310/313 R
(58) Field of Classification Search ......... 345/173–179; 178/18.01–18.04, 19.01, 19.02; 310/300, 310/311, 313 B, 313 D, 313 R, 314, 318  
See application file for complete search history.

(56) References Cited

U.S. PATENT DOCUMENTS

| | | |
|---|---|---|
| 3,134,099 A | 5/1964 | Woo |
| 3,653,031 A | 3/1972 | Hlady et al. |
| 3,673,327 A | 6/1972 | Johnson et al. |
| 3,775,560 A | 11/1973 | Ebeling et al. |
| 3,808,364 A | 4/1974 | Veith |
| 3,883,831 A | 5/1975 | Williamson et al. |
| 3,916,099 A | 10/1975 | Hlady |
| 3,956,745 A | 5/1976 | Ellis |
| 4,198,623 A | 4/1980 | Misek et al. |
| 4,208,648 A | 6/1980 | Naumann |
| 4,254,333 A | 3/1981 | Bergstorm |
| 4,286,289 A | 8/1981 | Ottesen et al. |
| 4,293,734 A | 10/1981 | Pepper |
| 4,294,543 A | 10/1981 | Apple et al. |
| 4,346,376 A | 8/1982 | Mallos |
| 4,403,165 A | 9/1983 | Ballato et al. |
| 4,448,837 A | 5/1984 | Ikeda et al. |
| 4,484,179 A | 11/1984 | Kasday |
| 4,488,000 A | 12/1984 | Glenn |
| 4,578,768 A | 3/1986 | Racine |
| 4,642,423 A | 2/1987 | Adler |
| 4,644,100 A | 2/1987 | Brenner et al. |
| 4,645,870 A | 2/1987 | Adler |
| 4,700,176 A | 10/1987 | Adler |
| 4,746,914 A | 5/1988 | Adler |
| 4,791,416 A | 12/1988 | Adler |
| 4,825,212 A | 4/1989 | Adler et al. |

(Continued)

OTHER PUBLICATIONS

G. W. Judd & J. L. Thoss, Use of Apodized Metal gratings in Fabricating Low Cost Quartz RAC Filters, IEEE 1980 Ultrasonics Symposium, pp. 343-347.

(Continued)

*Primary Examiner*—Kimnhung Nguyen  
(74) *Attorney, Agent, or Firm*—MacMillan, Sobanski & Todd, LLC

(57) ABSTRACT

An apparatus and system for recognizing touch positions is comprised of multiple acoustically coupled substrates, said coupling functioning also as an environmental seal. At least one secondary substrate, with means to transmit and receive acoustic waves, is coupled to a primary substrate capable of propagating acoustic waves such that an intentional touch on the surface causes a perturbation of the waves passing through a desired region of touch detection. Said perturbation is analyzed by circuitry to determine corresponding physical position of the touch on surface.

37 Claims, 11 Drawing Sheets

*(Basic Arrangement Schematic)*

U.S. PATENT DOCUMENTS

| | | | |
|---|---|---|---|
| 4,859,996 | A | 8/1989 | Adler et al. |
| 4,880,665 | A | 11/1989 | Adler et al. |
| RE33,151 | E | 1/1990 | Adler |
| 5,072,427 | A | 12/1991 | Knowles |
| 5,162,618 | A | 11/1992 | Knowles |
| 5,177,327 | A | 1/1993 | Knowles |
| 5,243,148 | A | 9/1993 | Knowles |
| 5,260,521 | A | 11/1993 | Knowles |
| 5,329,070 | A | 7/1994 | Knowles |
| 5,332,238 | A | 7/1994 | Borucki |
| 5,573,077 | A | 11/1996 | Knowles |
| 5,591,945 | A | 1/1997 | Kent |
| 5,708,461 | A | 1/1998 | Kent |
| 5,784,054 | A | 7/1998 | Armstrong et al. |
| 5,854,450 | A | 12/1998 | Kent |
| 6,091,406 | A * | 7/2000 | Kambara et al. ............ 345/177 |
| 6,236,391 | B1 | 5/2001 | Kent et al. |
| 6,254,105 | B1 | 7/2001 | Rinde et al. |
| 6,392,167 | B1 * | 5/2002 | Nakagawa ............... 178/18.04 |
| 6,411,287 | B1 | 6/2002 | Scharff et al. |
| 6,636,201 | B1 | 10/2003 | Gomes et al. |
| 6,948,371 | B2 * | 9/2005 | Tanaka et al. ................. 73/649 |
| 7,006,081 | B2 | 2/2006 | Kent et al. |
| 7,119,800 | B2 * | 10/2006 | Kent et al. .................. 345/177 |
| 7,204,148 | B2 * | 4/2007 | Tanaka et al. ................. 73/649 |
| 7,348,966 | B2 * | 3/2008 | Hong et al. ................. 345/173 |
| 2005/0248548 | A1 * | 11/2005 | Tsumura et al. ............. 345/177 |

OTHER PUBLICATIONS

D. R. Thompson, Finger Position Detect Method, IBM Technical Disclosure Bulletin, vol. 23, No. 7B, Dec. 1980, p. 3289.

Jerry D. Schermerhorn & Thomas F. Michalksi, Improvements in Saw Touch Systems, SID Symposium Digest of Technical Papers, May 1992, pp. 916-919.

* cited by examiner

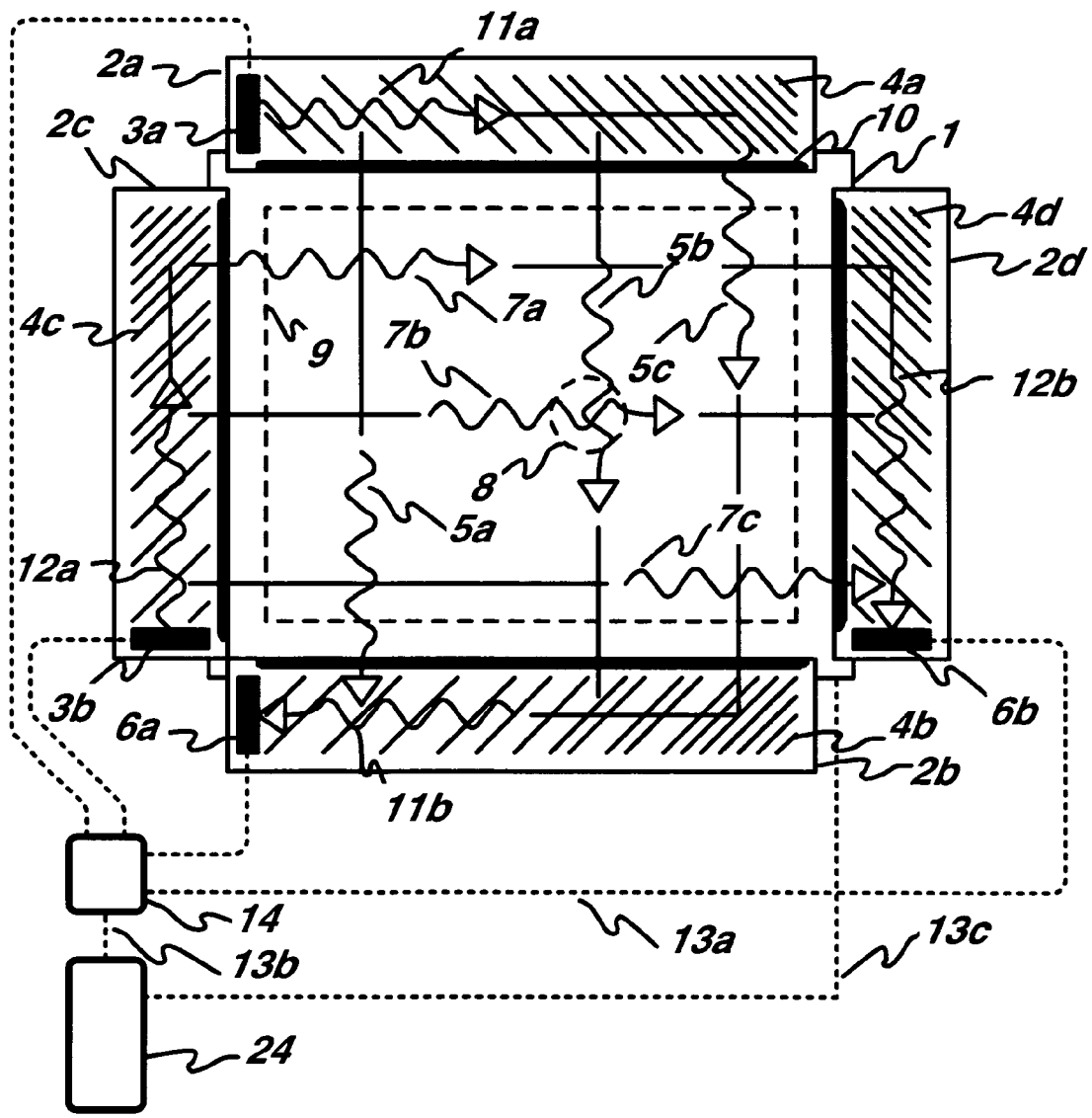
*FIG. 2a (Basic Arrangement Schematic)*

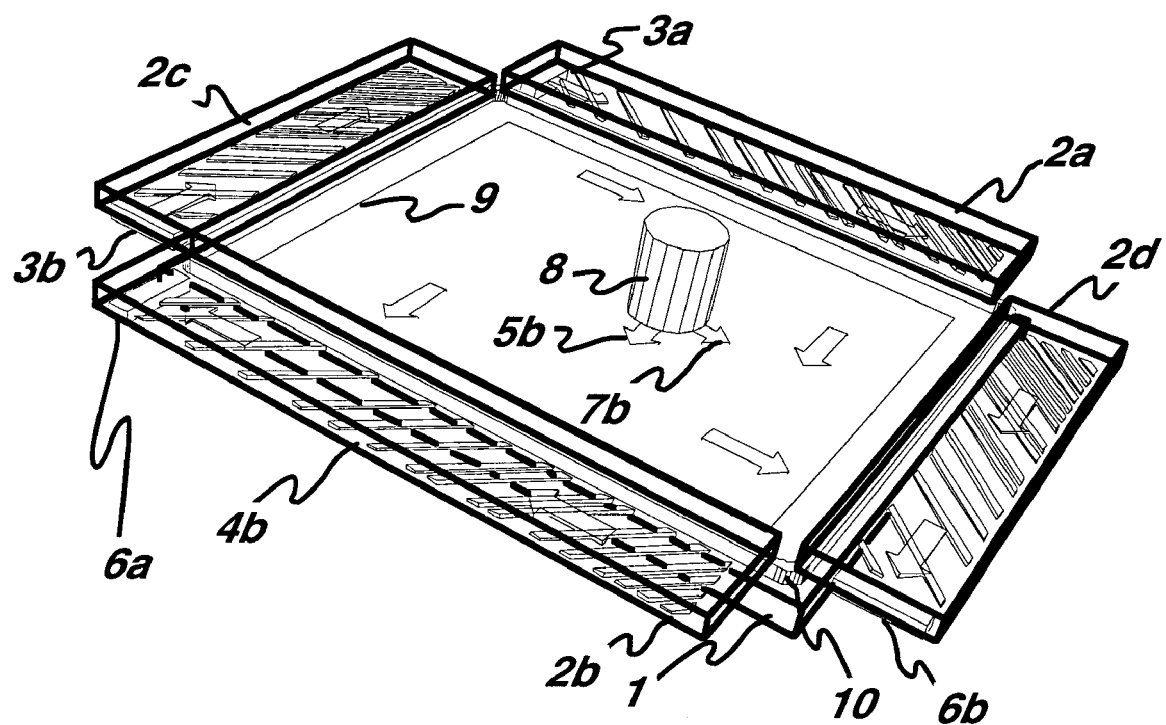
FIG. 2b (Basic Arangement 3D view)

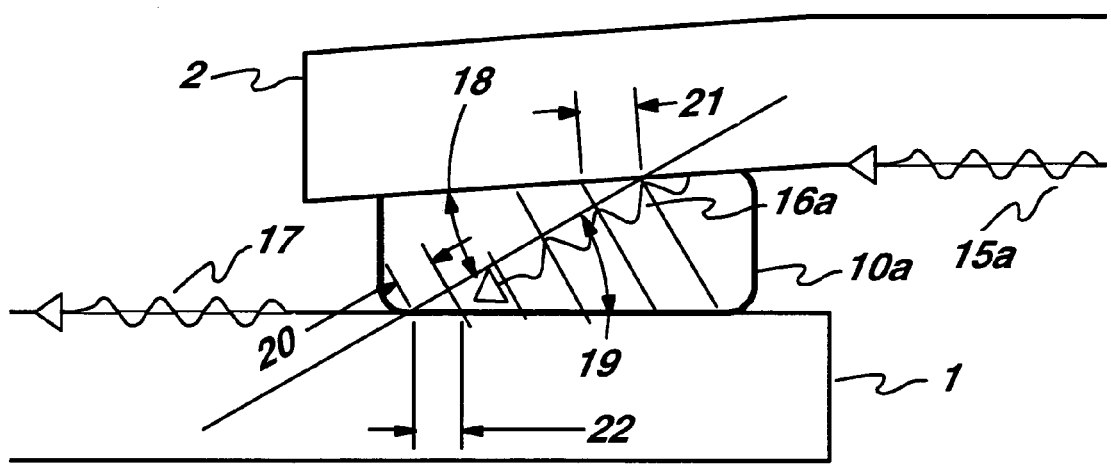
*FIG. 3a (coupling means example 1)*
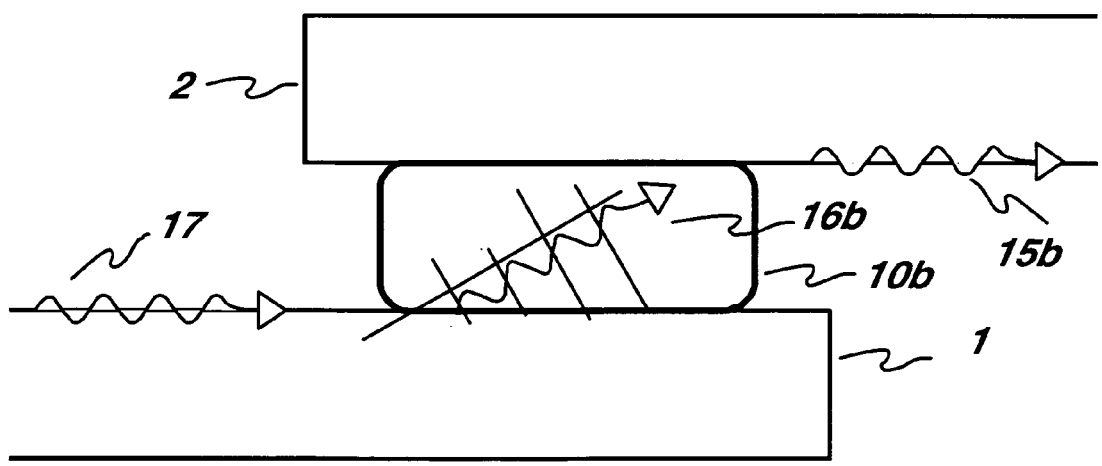
*Figure 3b (coupling means example 2)*

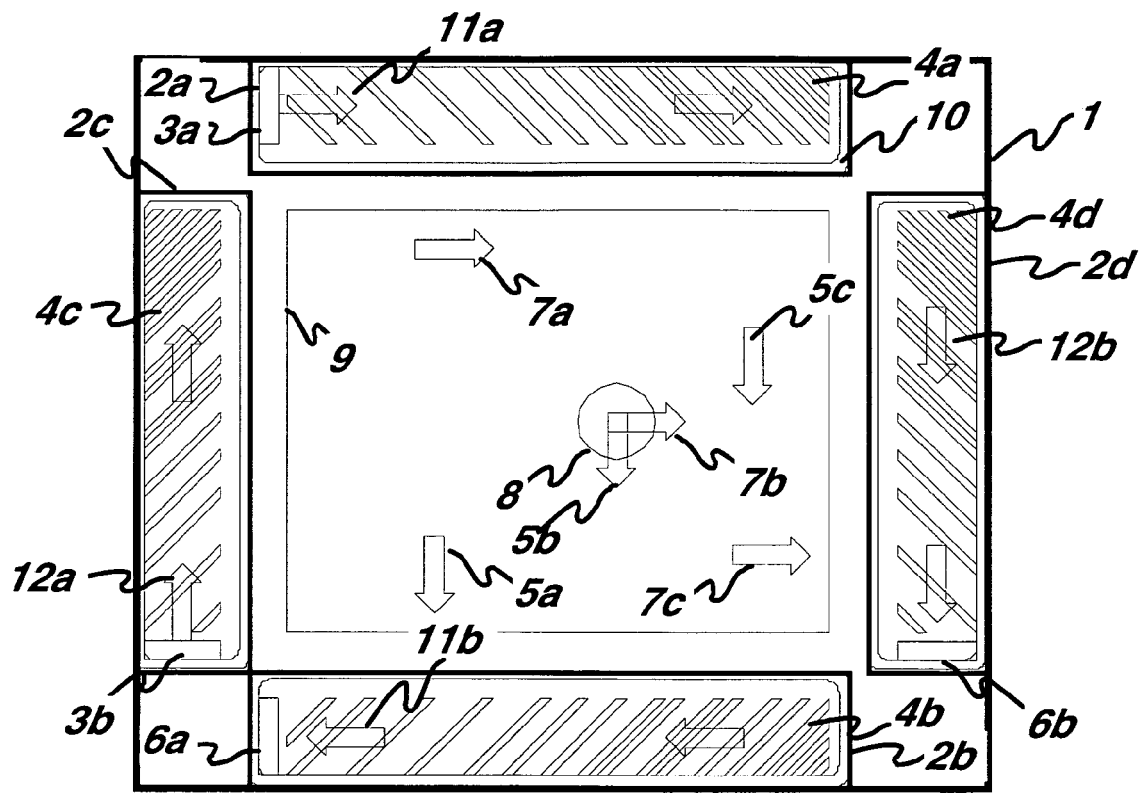
FIG. 4a (top view modular)

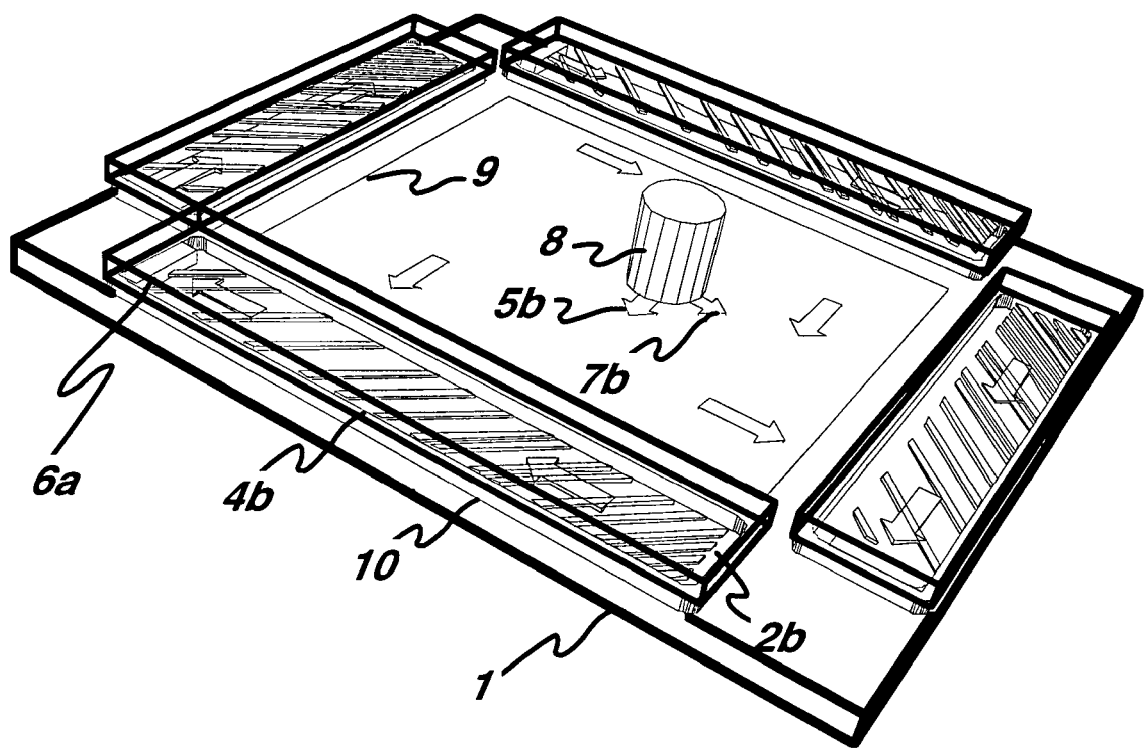
FIG. 4b (3D view modular design)

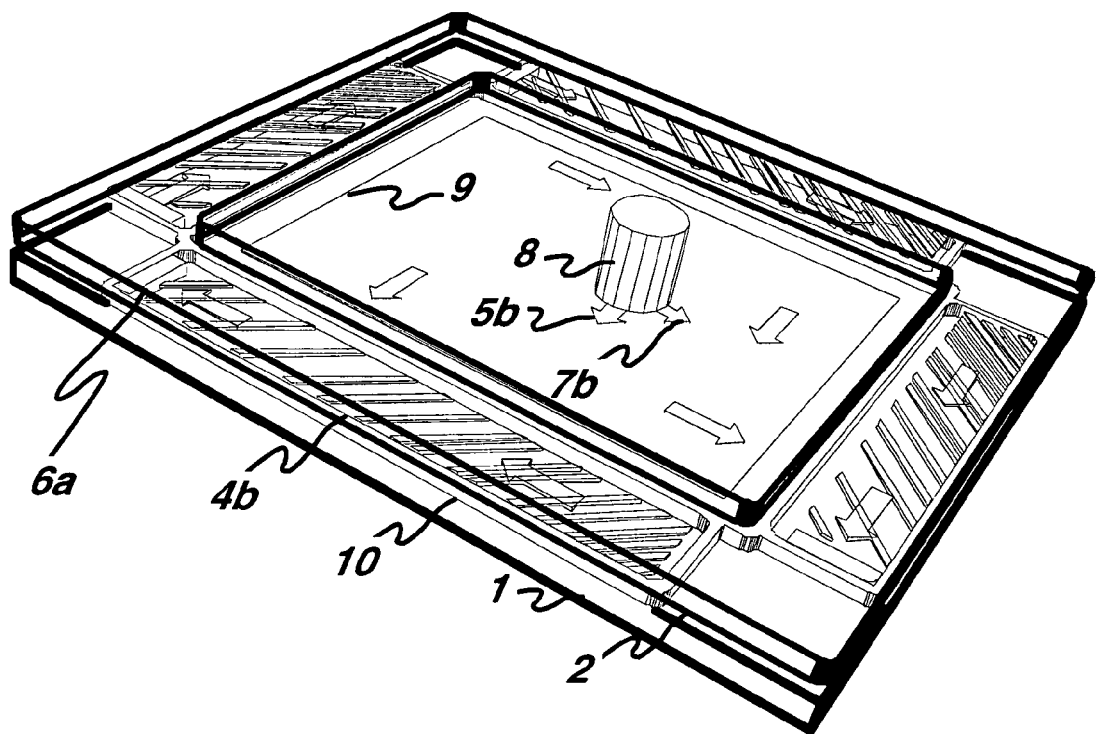
FIG. 5 (Secondary Substrate as Bezel)

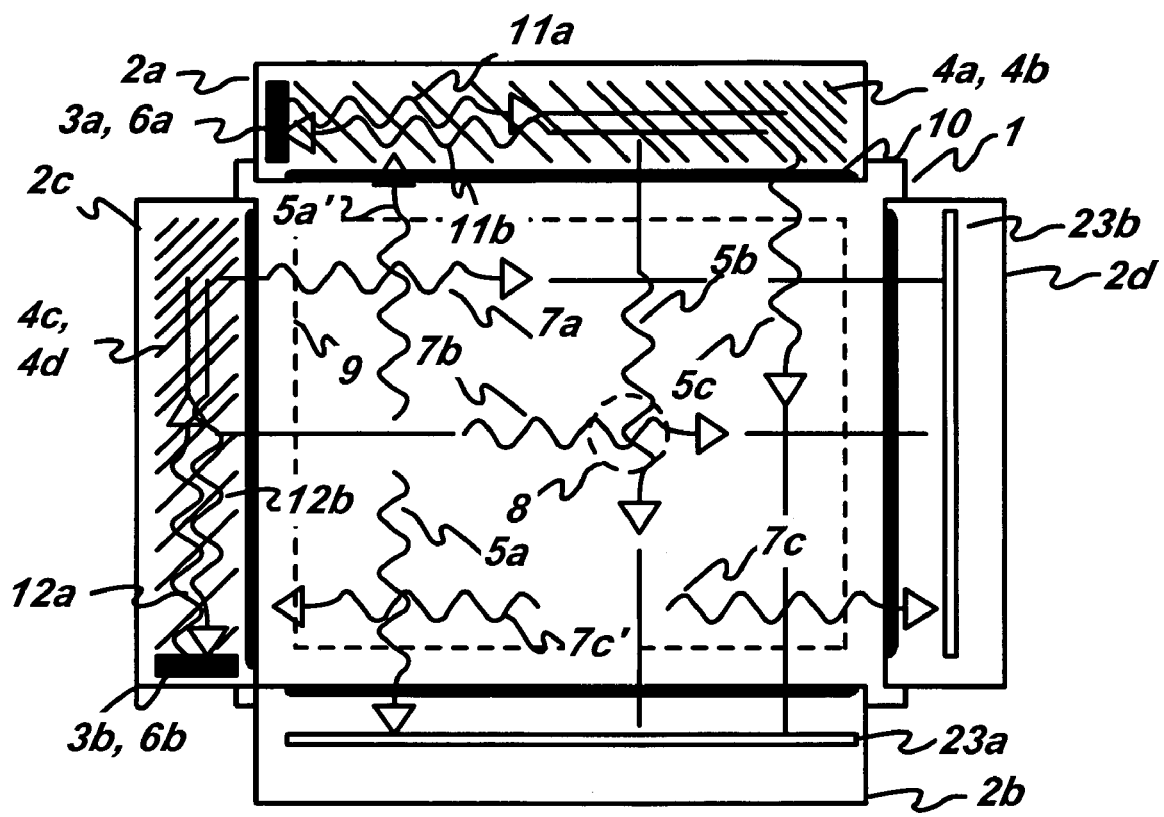
*FIG. 6a (Reflected embodiment)*

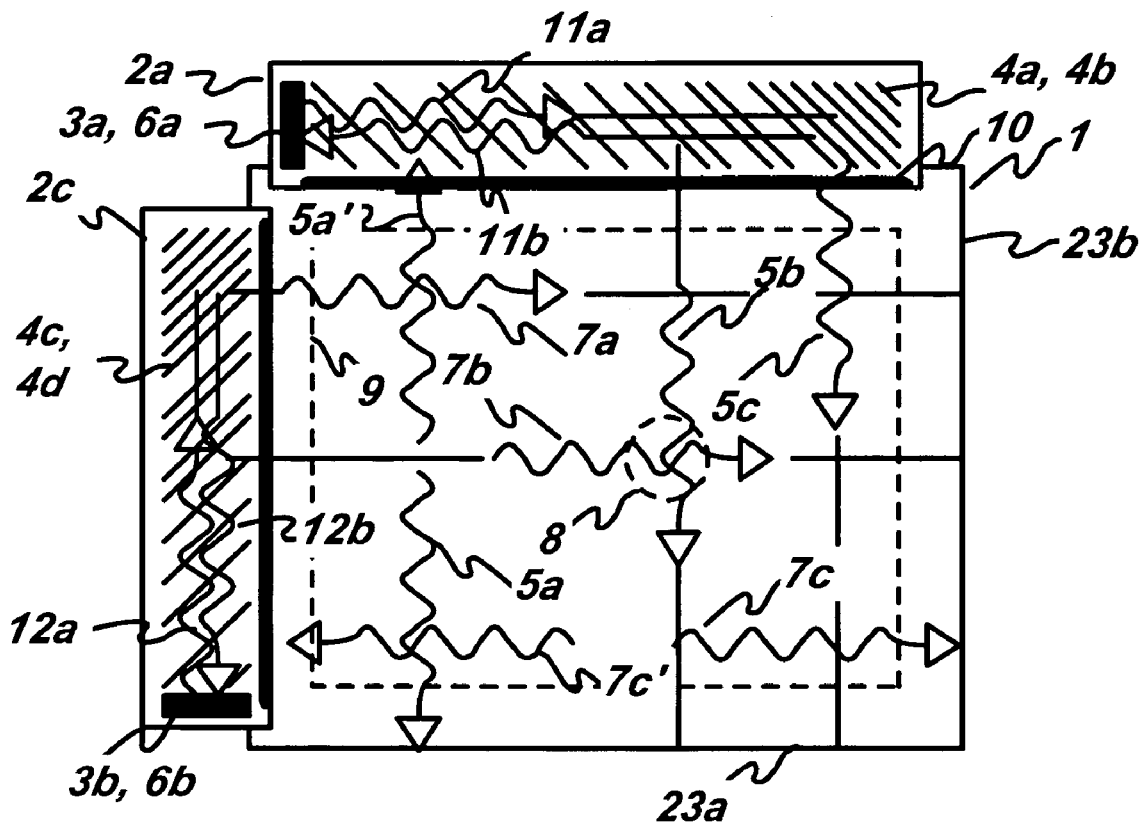
FIG. 6b (Reflected by edges)

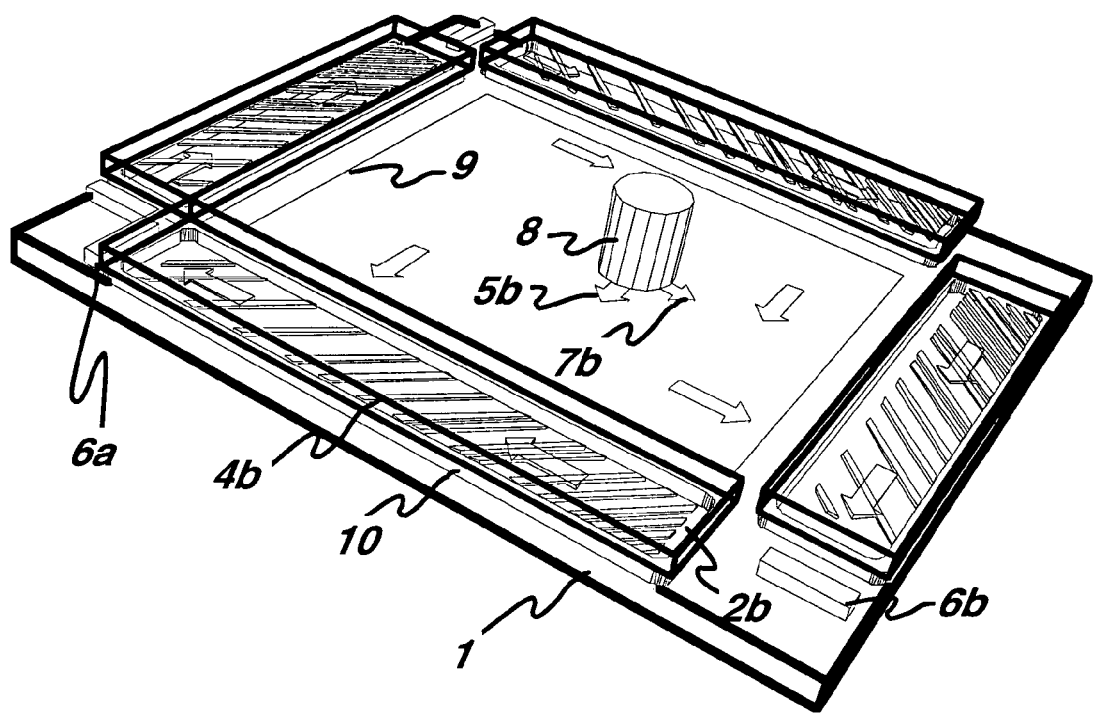
*FIG. 7 (repositioned transducers)*

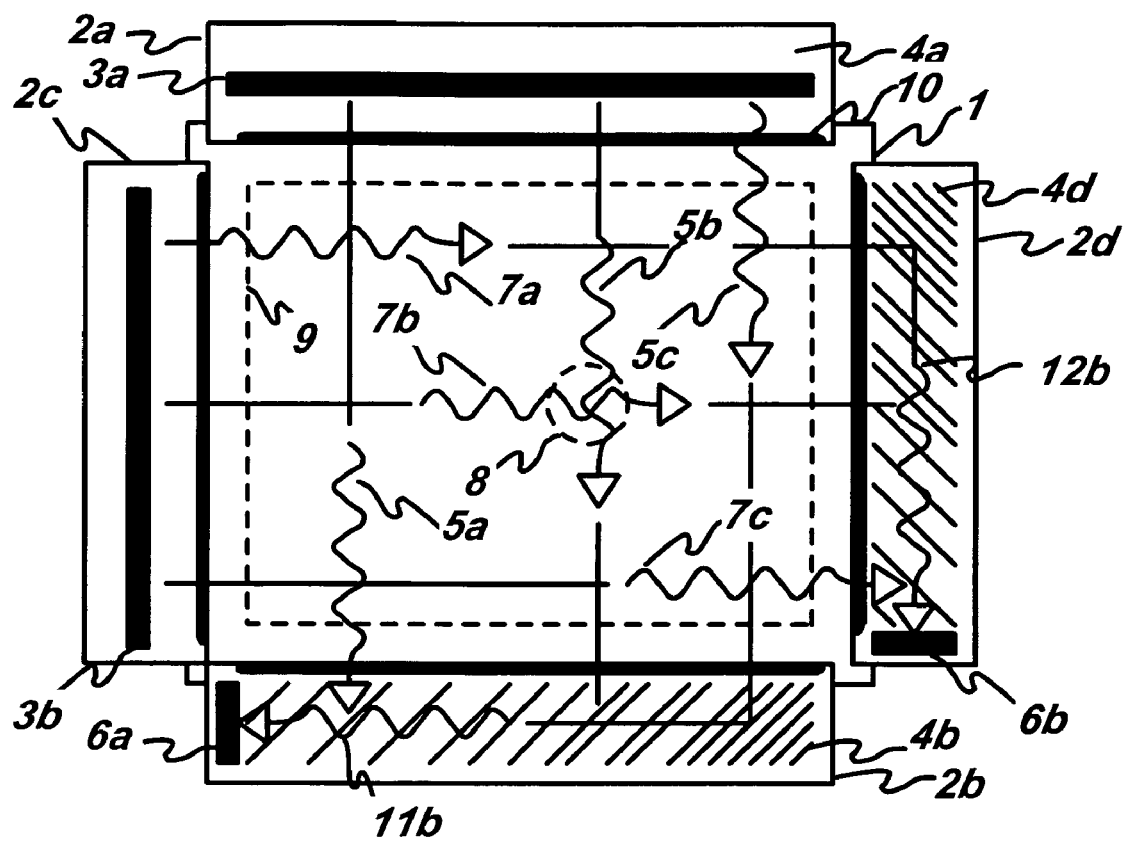
FIG. 8 *(long transmitters)*

TOUCH CONTROL SYSTEM AND APPARATUS WITH MULTIPLE ACOUSTIC COUPLED SUBSTRATES

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

This invention relates, in general, to a touch detection apparatus and touch control systems for use in conjunction with graphic display device or for controlling a remote device or process.

This invention concerns a touch detection apparatus or touch panel, one use of which is as a selector device for controlling a remotely located device. It is known to use a touch panel in the form of a keypad or keyboard tablet which may be connected to a graphic display or other device and is adapted to be disposed on a desk or work table. Examples of disclosures of such touch control tablets are found in U.S. Pat. No. 3,653,031.

Graphics display devices, of the type herein considered, generally utilize a cathode ray tube (CRT), a liquid crystal display (LCD), a plasma display panel (PDP), or any of several other display technologies which in a given application can be used. However, in some applications an actual standard glass window to a real world view could be the desired touch control region.

In the prior are there are three major touch detection systems in common use. The least expensive is an electrically resistive membrane placed in front of a display device. This technique is common in point of sale (POS) applications as typically seen in fast-food restaurants such a McDonalds, Wendy's, etc. The second is infra-red (IR) light beam technology, and the third is acoustic wave technology manufactured for example by ELO and Electro Plasma (licensed under U.S. Pat. No. 4,645,870). This application concerns the third type, utilizing acoustic wave absorbtion technology.

An acoustic touch detection system has a touch sensitive region on which the occurrence and location of a touch is sensed via the touch's effect, typically absorbtion of energy, on the transmission of acoustic waves transversing on or near the surface of the desired touch sensitive region. A common type of acoustic touch control apparatus employs Rayleigh waves, a term which, as used herein, subsumes quasi-Rayleigh waves. Acoustic touch control apparatus employing other types of acoustic waves such as Lamb or shear waves, or combinations of different types acoustic waves, including combinations involving Rayleigh waves, are also known.

Referring now to the drawings, there is illustrated in FIG. 1, the operation of a typical acoustic touch control apparatus having substrate 1 with an active, or touch sensitive region 9, that is defined as being inside the dotted line. A first transmitting transducer 3a is disposed upon the substrate 1 and positioned outside of touch sensitive region 9. The transducer 3a is acoustically coupled to the surface of touch control apparatus substrate 1, and is operable to send an acoustic signal in the form of an acoustic wave 11a traveling parallel to the top edge of touch control apparatus substrate 1 and generally in the plane of touch control substrate 1. Also disposed upon the substrate 1 and aligned in the transmission path of acoustic wave 11a is a linear array of partially acoustically reflective elements 4a, each of which is set an angle to the transmission path and partially reflects, by approximately 90 degrees as shown in FIG. 1, and partially transmits the acoustic signals, creating a plurality of acoustic waves, exemplarily 5a, 5b, and 5c, traveling vertically, or parallel to the Y-axis, across touch sensitive region 9 separated in time. The spacing of reflective elements 4a as shown in FIG. 1 is variable to compensate for the attenuation of the acoustic signals with increasing distance from first transmitter 3a. Acoustic waves 5a, 5b, and 5c, upon reaching the lower edge of touch control substrate 1, are again reflected by approximately 90.degree, as shown by arrow 11b, by another linear array of similarly partially acoustically reflective elements 4b that also are disposed upon substrate 1 towards a first receiving transducer 6a, where the waves are detected and converted to electrical signals for data processing.

Along the left and right edges of touch control apparatus substrate 1 are located a similar arrangement. A second transmitting transducer 3b generates an acoustic wave 12a that propagates along the left edge, with a linear array of partially acoustically reflective elements 4c creating a plurality of acoustic waves, exemplarily 7a, 7b, and 7c, traveling horizontally, or parallel to the X-axis, across touch sensitive region 9. Acoustic waves 7a, 7b, and 7c are redirected, as shown by arrow 12b, by yet another linear array of partially acoustically reflective elements 4d towards a receiving transducer 6b, where the waves are also detected and converted to electrical signals.

If touch sensitive region 9 is touched, for example at position 8, by an object such as a finger or a stylus, some of the energy of the acoustic waves 5b and 7b is absorbed by the touching object. The resulting attenuation is detected by receiving transducers 6a and 6b as a perturbation in the acoustic signal. Analysis of the data with the aid of a microprocessor (not shown) allows determination of the coordinates of position 8, and, if desired, a number relating to the amount of attenuation which may be interpreted as a pressure.

The touch control apparatus substrate 1 may be either a separate plate that is typically made of glass, or another hard substrate material, mounted over a display panel such as a cathode ray tube (CRT), a liquid crystal display (LCD), plasma display panels (PDP), electroluminescent, or other type of display. Alternatively touch control apparatus 1 may be constructed directly on the face of the display panel (e.g., CRT or plasma) itself or onto an optical or EMI filter, whatever is the first contactable surface of the display device.

In normal usage a housing (not shown) typically made of a molded polymer, is associated with touch control apparatus 1. Such a housing usually contains a bezel (not shown) that overlays touch control apparatus 1, cosmetically concealing the transmitting and receiving transducers, the reflective elements, and other components, but exposing touch sensitive region 9. Further, this arrangement protects the concealed components from contamination and/or damage, as well as presenting an aesthetically pleasing appearance, while also defining the touch sensitive region for the user.

The housing bezel may be spaced apart from touch control apparatus substrate 1. In an abutted configuration bezel attenuates the acoustic signals, reducing the touch control apparatus's responsiveness. However, a spaced-apart bezel leaves a gap through which contaminants, such as dirt, dust, and, especially, liquids, may enter and damage or interfere with the function of the concealed components. Acoustic touch control apparatus intended for operation in outdoor environments or in facilities such as restaurants or factories, where exposure to rain, fog, spills, sprays, or cleaning solutions is a likelihood, are especially vulnerable in this regard.

Theoretically, a liquid-impermeable seal can be formed by applying a caulking between the bezel and touch control apparatus substrate 1 around the perimeter of active area 9, but the caulking will absorb acoustic energy, interfering with touch control apparatus operation. Rayleigh wave touch control apparatus, because of the surface-propagating nature of their acoustic waves, are especially likely to be adversely affected. U.S. Pat. No. 5,332,238 to Borucki, hereinafter referred to as the Borucki patent, and incorporated herein by reference, states that a caulking will not only absorb significant amounts of acoustic energy so as to render the touch control apparatus inoperable, but will also acoustically couple the substrate 1 to the screen and can cause a false touch to be registered around the entire perimeter of the screen.

The solution to the sealing problems disclosed in the Borucki patent is to employ a foam strip compressed between the bezel/housing and the touch control apparatus. Acoustic attenuation is limited to an acceptable level by placing an open-cell surface of the foam against the touch control apparatus or by restricting contact with the touch control apparatus to a corner of the foam.

An alternative bezel sealing arrangement is disclosed in U.S. Pat. No. 5,784,054 to Armstrong et al., hereinafter referred to as the Armstrong patent, and incorporated herein by reference, in which a sealing strip made of closed cell foam or, alternatively, expanded polytetrafluoroethylene, is preferably adhesively affixed to the bezel.

Whatever the sealing system, it is operationally desirable to limit acoustic signal loss attributable to the sealant to less than −6 dB as stated in U.S. Pat. No. 6,254,105.

Therefore, while SAW technology has proven to be both ergonomically acceptable and reliable, there are several draw-backs. First, while the printing and firing process applied directly onto a display device provides the best cosmetic arrangement, the process can become rather costly due to the attendant lower manufacturing yields. Second, the placement of the reflector arrays on the display faceplate or glass overlay is associated with significant signal loss due to the attenuation of such surface acoustic waves in glass. This limits the size of touch systems which are in practical use. Furthermore, the reflector arrays, although generally covered with a bezel, are not easily sealed and therefore are exposed to the environment, subject to physical and chemical abuse as well as contamination such a condensing water or spilled drinks such as coffee or soda pop.

Accordingly, it would be desirable to provide an acoustic wave touch control system that could be more easily applied directly to display devices or directly to windows, used over a geometrically larger area, and function under more severe environmental constraints than the prior art systems described above.

BRIEF SUMMARY OF THE INVENTION

It is an object of this invention to provide an acoustic wave touch control system for use in or with a display apparatus, or for controlling a remote device such as an electrical apparatus, wherein such systems can be more easily applied directly to display devices, directly to windows, used over a geometrically larger area, and function under more severe environmental constraints.

The present invention contemplates a touch detection apparatus that includes a primary substrate having a surface capable of propagating acoustic waves and being so characterized that the surface is touch sensitive such that a touch on the surface causes a perturbation, in the form of at least a partial absorption of energy, of an acoustic wave propagating through a region of desired touch detection. The apparatus also includes at least one transmitter secondary substrate mounted along an edge of the primary substrate and at least one receiver secondary substrate mounted along another edge of the primary substrate opposite from the transmitter secondary substrate. The apparatus further includes at least one input transducer, coupled to a the transmitter secondary substrate, which is operative to launch a burst of acoustic waves onto the transmitter secondary substrate and at least one output acoustic wave transducer coupled to the receiver secondary substrate that detects received acoustic waves. Additionally, the apparatus includes a first coupling means disposed between the transmitter secondary substrate and the primary substrate to transfer the wave components to a first edge defining a first axis of the desired touch sensing area of the primary substrate surface, and a second coupling means disposed between the primary substrate and the receiver secondary substrate to transfer and redirect acoustic waves to the output transducer after propagating across the first surface at least once such that the wave components are caused to traverse the axis along a progression of paths differing in time and associated with different touch positions along the axis.

The invention further contemplates that the apparatus also may include at least one wave redirecting means disposed upon at least one secondary substrate which derives wave components separated in time from a launched wave, the wave components substantially perpendicular to the launched wave.

Additionally, the invention contemplates that the apparatus includes circuitry coupled to the input and output transducers which initiates acoustic wave bursts causing derived wave components separated in time across the primary substrate surface and detects touch-induced perturbations of the received waves indicative of the location of a touch along the axis, the circuit means also including means for determining, by an analysis based on the transit time of the detected perturbed wave burst component, which of a plurality of paths was traversed by the touch-perturbed wave burst component and thus determining the location of the touch along the axis of the substrate surface.

Various objects and advantages of this invention will become apparent to those skilled in the art from the following detailed description of the preferred embodiment, when read in light of the accompanying drawings.

BRIEF DESCRIPTION OF THE DRAWINGS

FIG. 2a illustrates, partially in schematic form, a top view sketch of a touch detection apparatus embodying the basic novel features of the present invention.

FIG. 2b illustrates a 3-D sketch of the touch detection apparatus shown in FIG. 2a.

FIG. 3a illustrates, partially in schematic form, a section view illustrating the novel arrangement and acoustical coupling of secondary substrates to the desired touch sensitive region on the first substrate for the touch detection apparatus shown in FIG. 2a.

FIG. 3b illustrates an alternate embodiment of the coupling arrangement shown in FIG. 3a.

FIG. 4a illustrates, partially in schematic form, a top view sketch of a touch detection apparatus according to the present invention that has geometry to provide an inherent protective seal as can be assembled in modular sections.

FIG. 4b illustrates a 3-D sketch of the touch detection apparatus shown in FIG. 4a.

FIG. 5 illustrates, with a 3-D sketch, an alternate configuration of the touch detection apparatus shown in FIG. 2a wherein the secondary substrates are combined into one as a bezel.

FIG. 6a illustrates, partially in schematic form, a top view of a touch detection apparatus in accordance with the invention that employs an acoustic reflector causing acoustic waves to transverse the desired touch sensitive region twice per each path.

FIG. 6b illustrates an alternate embodiment of the touch detection apparatus shown in FIG. 6a that utilizes reflections at an edge of the primary substrate 1.

FIG. 7 illustrates, with a 3-D sketch, an alternate configuration of the touch detection apparatus in accordance with the invention wherein the transducers for transmitting and receiving are indirectly coupled to the secondary substrates via the primary substrate.

FIG. 8 illustrates, partially in schematic form, a top view of a touch detection apparatus in accordance with the invention comprising a long transmitting device on the first secondary substrate.

DETAILED DESCRIPTION OF THE PREFERRED EMBODIMENT

Figure 1:
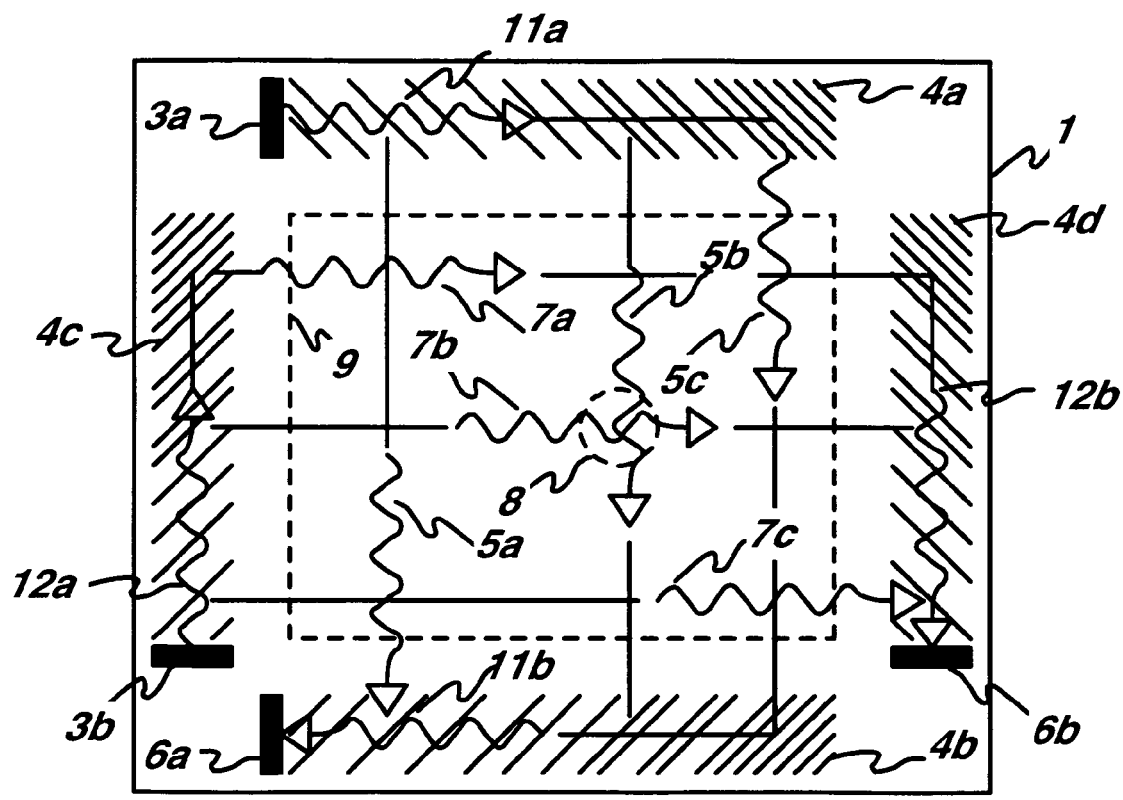
FIG. 1 illustrates, partially in schematic form, a top view of a touch detection apparatus illustrating the prior art.

The inventor has developed a novel configuration for acoustic touch detection systems that consists of multiple substrates. It is built on a primary substrate and utilizes one or multiple secondary substrates for wave generation and propagation that are coupled to the primary substrate and have different properties therefrom.

This present invention solves or improves three problems historically associated with such systems. The three problems summarized are:

First, in a typical prior art arrangement wherein the desired touch region is to correspond to a visual display, the only reasonable choice of substrate material is glass, and typically a lead glass, as is utilized in a Cathode Ray Tube (CRT) display, soda lime glass, such as an ordinary window glass, or another float glass, as used in Plasma Display Panels (PDP) and most optical filter substrates. All of these substrate materials significantly attenuate the acoustic wave amplitude as it propagates along the surface, thus limiting the size of practical touch displays because the acoustic waves must travel not only across the desired touch region but also twice along two edge lengths which comprise the wave redirecting arrays.

Second, as the acoustic wave redirecting arrays constructed on the glass substrate are almost necessarily for economic and compatibility reasons glass frit fired at high temperature, the manufacturing process thereby is caused to have lowered yields. Further, replacement of damaged or defective parts is also correspondingly higher.

Third, as the acoustic wave redirecting arrays are located on same substrate as the desired touch detection region, and acoustic waves must transverse along the surface, it is difficult to provide a protective seal for the redirecting arrays, coupled transducers, and other associated components because typical sealing materials severely divert and attenuate the acoustic wave. Prior art seal systems have difficulty limiting this attenuation to at least −6 db, as stated in U.S. Pat. No. 6,236,391, and, even worse, to keep it non-varying which, if varying, causes false touch reports.

Now it is well known that other materials, such as steel, aluminum, or brass transmit sound more efficiently than glass, but are opaque. Indeed, although some glasses are more efficient, they are typically expensive or otherwise unusable with existing display devices. However, if the acoustic wave redirecting arrays could exist on a more efficient surface the first problem listed above would be significantly reduced and larger touch systems could be built. Modifying the glass substrate in the array regions, perhaps laminating a thin layer of a material such as brass or aluminum is out of the question, being very impractical because the thermal expansion coefficients are very different.

The inventor has determined that just that can be done in a novel arrangement wherein the redirected waves can easily and relatively efficiently be coupled, or transferred, from one substrate of a different material, such as, for example, aluminum to the touch region on a substrate of glass. The inventor has developed an arrangement of two overlapping substrates wherein the acoustic waves are easily transferred between facing surfaces utilizing a coupling material with the property that the wavelength of the longitudinal bulk wavelength is less than the surface wavelength of either substrate. This acoustic coupling means is illustrated in FIG. 3 and described in the following detailed description section of the present invention.

The benefits of this coupling means, by allowing the acoustic wave redirecting reflector arrays to be positioned on a secondary substrate with less acoustic energy loss, can now be seen to also provide a sealing method with acceptable and non-varying attenuation. Indeed, such seal means can be extended to surround and isolate the reflector arrays and further to seal the entire periphery of the desired touch region. Moreover, the construction of the reflector arrays can be of more exacting and less expensive manufacturing methods as is commonly available, such as stamping, etching, electroplating, anodizing, etc. Thermal expansion mismatch can be compensated for by laminating a material, not shown, to the back of the secondary substrates. Therefore, all of the three problems listed above are solved or significantly reduced by this novel configuration Referring again to the drawings, there is illustrated, for example most basically in FIG. 2, an acoustic touch detection apparatus that includes components 1 through 23 and that is in accordance with the present invention. Components shown in FIG. 2 that are similar to components shown in FIG. 1 have the same numerical identifiers. The apparatus may be part of graphics display apparatus, the first contactable surface corresponding to displayed images being integral to said graphic display. Such graphic display typically comprising a graphics controller, not shown, and a display device such as an LCD, CRT, or PDP having a touchable display surface 9. However, it is to be appreciated that the invention is readily applicable to other display devices, e.g., electroluminescent, LED, or even displays as simple as an elevator number display, any of these can be employed. Moreover, the controlled apparatus need not necessarily be a display device since the touch control system to be described can, as readily, evoke a response from other types of controllable apparatus. In some applications, a separate panel is disposed over the faceplate of the display device or, if desired, such separate panel can be disposed at a location remote from the controlled device or be a window to a real world view.

In the apparatus illustrated in FIG. 2, the apparatus includes a primary substrate 1, is typically the faceplate, or panel, commonly designated a "touch control panel" or simply "touch panel" since graphics, or other information may be ordered up for display from a controller 24 in response to an operator's command which can take the form of a touching of a particular area of a menu associated with the touch control panel. In the preferred embodiment, the primary substrate is formed from a transparent material, such as a glass that would be utilizes in one of the devices described in the immediately preceding paragraph and also including soda lime glass, leaded glass and EMI glass. The display surface corresponds to the touch region 9, whether it is an actual graphic apparatus faceplate, optical or EMI filter, the window of a building or vehicle, or a separate panel, any of these constitutes a primary substrate 1, the surface of which is capable of propagating surface acoustic waves.

It is to be appreciated that the touch panel can adopt the format of a tablet, e.g., a sheet of glass or other substrate capable of propagating surface acoustic waves which, in the interests of convenience, or to import flexibility to the system, can be positioned at a location remote from the apparatus to be controlled. More particularly, a touch control tablet which is positioned at a location remote from a controlled image display device can be a video monitor or computer display monitor. A touch control panel can be coupled to the monitor by a cable 13. However, it is recognized that the control effects instituted by the tablet could readily be applied to the monitor by an infrared (IR) or other wireless means so as to dispense with cabling. Moreover, as noted, the apparatus controlled by the touch control tablet need not be an image display device. It can be, by way of example, a home entertainment center (radio, stereo, TV, etc.), actuated by a remotely located touch control tablet.

Such a touch panel according to this invention works as follows. The act of touching serves to interrupt or reduce wave energy directed along one or more paths that form a grid overlying the panel. Detection and analysis of such interruption serves to identify the X, Y, or other coordinates of the touched area, and, if desired, a number relating to the amount of wave energy reduction loosely interpreted as a pressure, which information, in turn, is determinative of the graphics to be delivered up for display or other response as intended by a purposefully initiated touch.

To this end, the touch control system may further include a computer for the controller 24 for rendering an interface circuit 14 operative in a predetermined sequence so that when a perturbation, or interruption of acoustic wave energy is detected, converted to an electrical signal and fed back to the computer, via said interface circuit, such that the location of the interruption is identifiable by the computer. The computer utilized for the controller 24, appropriately programmed, can then take any predetermined controlled action as necessary with devices controlled by, or in communication with, said system. Such action typically includes the output of appropriate information to a display controller to change the video display to graphics associated with the "touch panel" address intentionally activated by the operator.

A conventional touch screen interface circuit 14 has input terminals coupled, via a cable 13a, to receiver transducers 6a, 6b and output terminals coupled to transmitter transducers 3a, 3b which are positioned as illustrated in FIG. 2a. It is understood that the interface circuit 14 has additional input and output terminals or cable 13b that may be coupled to the computer 24 for interacting therewith. Preferably, the interface circuit 14, often in conjunction with timing signals from a computer, outputs firing signals that stimulate transducers 3a and 3b in a timed sequence so that the location of a subsequent interruption of a surface wave is identifiable.

At least one transmitter transducer 3 which may be of the type particularly described in the Adler patent, is coupled to or mounted upon the bottom, or lower, surface of at least one secondary substrate 2 that is carried along an edge of the primary substrate 1. The transmitter transducer couples acoustic energy to the secondary substrate. For the apparatus shown in FIG. 2, there are two secondary substrates 2a and 2b with transducer 3a mounted upon one of the secondary substrates 2a and transducer 3b mounted upon the other of the secondary substrates 2b.

An energy source (not shown) in the interface circuit 14 serves to apply input signals to transmitter, or input, transducers 3a and 3b, as shown in FIG. 2, which transducers, in response thereto, individually launch a burst of acoustic surface waves along first and second paths 11a, 12a, respectively on or near the bottom surfaces of substrates 2a and 2c which carry wave directing arrays 4a and 4c. The arrays 4a and 4c derive wave components 5a, 5b, and 5c and 7a, 7b, and 7c directed toward the edge of substrates 2a and 2c geometrically positioned near and towards the touch sensitive surface 9, on the upper, or top, surface of substrate 1. As illustrated in FIG. 3, wave components are acoustically coupled via coupling material 10a and transferred from the bottom surfaces of the secondary substrates 2a and 2c to the top surface, or near the top surface, of primary substrate 1 to transverse the touch sensitive region 9.

Also as shown in FIG. 2, the first and second receiver, or output, transducers 6a and 6b, are disposed upon and acoustically coupled to the bottom surfaces of their own secondary substrates 2b and 2d which are mounted along edges of the primary substrate 1 opposite from corresponding secondary substrates, 2a and 2c, respectively. The invention contemplates that, in the preferred embodiment, the secondary substrates 2a and 2c are formed from a metallic material, such as, for example, aluminum, brass, steel, nickel, chrome, copper, or combinations and alloys thereof or from a high efficiency tempered glass. The output transducers 6a and 6b develop electrical signals in response to acoustic energy received along paths 11b and 12b along the bottom surfaces of the substrates 2b and 2d. This acoustic energy is collected by the wave component directing arrays 4b and 4d, disposed upon the bottom surfaces of substrates 2b and 2d, from derived wave components 5a, 5b, and 5c and 7a, 7b, and 7c which are received after propagating across the touch sensitive region 9 on the top surface of the primary substrate 1 and acoustically coupled via coupling material 10a and transferred to the bottom surfaces of substrates 2b and 2d. The invention contemplates that, in the preferred embodiment, the secondary substrates 2b and 2d also are formed from a metallic material, such as, for example, aluminum, brass, steel, nickel, chrome, copper, or combinations and alloys thereof or from a high efficiency tempered glass, while the coupling material is selected as one of the group of an acrylic glass such as Plexiglass, an acrylic glass such as Lucite (Polymethyl methacrylate (PMMA), poly(methyl 2-methylpropenoate), an elastomer, rubber, latex, silicone, a grease, and combinations thereof. The invention also contemplates that, in the preferred embodiment, the wave component directing arrays 4a, 4b, 4c and 4d comprise individual reflectors elements created by steps or grooves oriented at an angle in the basic substrate material that are formed by a processes of etching, stamping, molding, plating or screening and firing.

Receiver transducers 6a and 6b, upon receipt of the surface waves launched by their associated input transducers develop respective output signals which, upon analysis, will exhibit a characteristic of the launched surface wave. Such characteristic, e.g. a change in amplitude, is attributable to a perturbation of a received surface wave component relating to an intentionally touched probe shown at position 8 in FIG. 2b, which diverts, or damps, acoustic energy from the wave burst components 5b and 7b associated with probe position 8 and the time the wave burst components pass through it relative to the time the bursts were initiated.

While the preferred embodiment of the invention has been illustrated and described as utilizing surface acoustic waves, it will be appreciated that the invention also may be practiced with any acoustic waves that propagate through the primary and secondary substrates, preferably near the surfaces thereof.

An important difference between the present invention and prior art devices is that prior art, as exemplified by the afore referenced Adler patent, specifically and intentionally claimed and specified a single substrate associated with the touch region and wave component generating arrays. Indeed, the novelty of arrangement of functions in the present invention is due to a coupling means, specifically a proper choice of material and geometry, to acoustically couple and transfer surface or near surface waves between independent substrates which can be of different physical properties.

The general principal of this coupling means is similar to that of wedge transducers commonly used to initiate surface waves for surface analysis and quality testing. Referring to FIG. 3a, an acoustic wave 15a traveling toward an edge on or near the surface of the secondary substrate 2 is converted into a longitudinal bulk wave 16a at the junction of the coupling material 10a just as if it were passing through a wedge transducer. This coupling is quite efficient, having coupling coefficients of typically 60% to 80% wave amplitude reduction, or more, and travels at an angle 18 to the surface determined by arc-cos (longitudinal wavelength in the coupling material 10a/surface wavelength along surface 2). As the bulk wave 16a travels through to the other, now facing, surface of the substrate 1 to be intentionally touched, it is again converted into a surface wave 17 which then travels on or near the surface of the substrate 1 to be intentionally touched. The second conversion is most efficient at the angle 19 determined by arc-cos(longitudinal wavelength in the coupling/surface wavelength along surface 1).

This two-step conversion coupling method transfers acoustic waves most efficiently when the two substrates are at a slight angle to each other in the region of coupling as illustrated in FIG. 3a. However, coupling materials can be chosen with properties such that the loss is small even when the substrates are parallel, as shown in FIG. 3b. Indeed, as long as there is intimate contact, which can be accomplished by physical bonding, along the entire axis the coupling is non-critical to the dimensions of the coupling material. The following example illustrates this relationship in some detail so that both the elegance and novelty of this invention may be fully appreciated.

Example

The following example illustrates the calculation of the angles 18 and 19 of FIG. 3a for selected materials. Selecting Lucite as the coupling material 10, glass for the primary substrate 1 whereupon touches are detected, and aluminum for the secondary substrates 2, acoustic waves are generated with a frequency of 5.53 MHz, which is common in the industry because of compatibility with communication systems. The velocity of acoustic waves in these materials, and several others, are summarized as follows:

| MATERIAL | Wave Velocities in cm/usec | | |
|---|---|---|---|
| | Longitudinal | Shear | Surface |
| Aluminum | 0.635 | 0.310 | 0.290 |
| Brass | x | x | 0.148 |
| Glass (float) | 0.679 | 0.343 | 0.310 |
| Steel | x | x | 0.281 |
| Lucite | 0.268 | x | x |
| Rubber | 0.149 | x | x |

Calculating per the relationships given above, the results are:
For angle 18 (aluminum and Lucite)—22.46 degrees
For angle 19 (glass and Lucite)—30.17 degrees
Now, if it is assumed that the coupling material 10 is rubber, the results are:
For angle 18 (aluminum and rubber)—59.08 degrees
For angle 19 (glass and rubber)—61.27 degrees Now this is a very interesting result. With rubber, there is only about 2 degrees difference between the calculated values for angles 18 and 19. It is therefore possible to just fill a gap at the edge between two facing parallel substrates, either an ultraviolet or air curing silicone rubber will work well, and a reasonably efficient coupling results, well within the −6 db design goal. Further, the width and thickness of the coupling material 10 are not critical. The bond can be arbitrarily thin. Experience teaches that the width of the coupling material seal, although not critical, should be about 5 wavelengths, that is, about 5×0.022 in (for glass)=0.11 in. or about ⅛ inch. Use of a rubber product, such as RTV silicone is also perfect for forming seals.

The realization that this coupling material in this geometrical configuration can also be used as a seal has already been mentioned. There are several embodiments of this invention contemplated which utilize this fact. First, the touch apparatus can be built and sealed modularly as illustrated in FIG. 4. This is the preferred embodiment for larger size touch systems. Here, each wave component deriving or gathering redirecting reflector array 4a, 4b, 4c, and 4d on substrates 2a, 2b, 2c, and 2d can be individually attached and sealed to any touch substrate capable of propagating acoustic waves, without modification of that substrate except simple attachment with a common and inexpensive calking method, e.g. RTV silicone, at room temperature.

An alternate embodiment of the invention, shown in FIG. 5, uses a common secondary substrate formed into a protective bezel. Another alternate embodiment of the invention, shown in FIG. 6a includes reflective secondary substrates that reflect the acoustic waves back to the secondary substrate carrying the transmitter transducer. This embodiment also contemplates that the transducer functions as both transmitting and receiving transducers with the propagation of the acoustic waves illustrated by the arrows shown in FIG. 6a. An alternate embodiment of the screen shown in FIG. 6a is illustrated in FIG. 6b that utilizes reflections at an edge of the primary substrate 1 without provision of a secondary substrate.

Other possible embodiments include, but are not limited to, the acoustic coupling of the transducers external to the secondary arrays as illustrated in FIG. 7, the bending of the substrates 2 around the sides of a display device to lessen the edge, or bezel border dimension, and lamination of materials to the fronts of the secondary substrates 2 to compensate for temperature induced stress due to differing expansion coefficients. Yet another embodiment of the invention is illustrated in FIG. 8, which includes longer transmitting devices, 3a and 3b, that extend along their respective secondary substrates 2a and 2c parallel to the edge of the primary substrate 1. Thus, the transmitting devices 3a and 3b launch acoustic waves directly across the primary substrate 1, as illustrated by the arrows labeled 5a, 5b, 5c, 7a, 7b and 7c.

Still other embodiments and implementations of the present invention are contemplated and are within the spirit and scope of this invention. For example, the long transmitters shown in FIG. 8 may be utilized with the reflective edges of the primary substrate 1 illustrated in FIG. 6a, in conjunction with a receiving array on the same secondary substrate.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A touch detection apparatus comprising:
a primary substrate having a surface capable of propagating acoustic waves and being so characterized that said surface is touch sensitive such that a touch on said surface causes a perturbation, in the form of at least a partial absorption of energy, of an acoustic wave propagating through a region of desired touch detection;
at least one transmitter secondary substrate mounted along an edge of said primary substrate;
at least one receiver secondary substrate mounted along another edge of said primary substrate opposite from said transmitter secondary substrate;
at least one input transducer, coupled to a said transmitter secondary substrate, which is operative to launch a burst of acoustic waves onto said transmitter secondary substrate;
at least one output acoustic wave transducer coupled to said receiver secondary substrate that detects received acoustic waves;
a first coupling means disposed between said transmitter secondary substrate and said primary substrate to transfer acoustic wave components to a first edge defining a first axis of the desired touch sensing area of said primary substrate surface;
a second coupling means disposed between said primary substrate and said receiver secondary substrate to transfer and redirect acoustic waves to the output transducer after propagating across the first surface at least once such that said wave components are caused to traverse said axis along a progression of paths differing in time and associated with different touch positions along the axis;
at least one wave redirecting means disposed upon at least one secondary substrate which derives wave components separated in time from a launched wave, said wave components substantially perpendicular to the launched wave; and
circuitry coupled to said input and output transducers which initiates acoustic wave bursts causing derived wave components separated in time across said primary substrate surface and detects touch-induced perturbations of said received waves indicative of the location of a touch along said axis, said circuit means also including means for determining, by an analysis based on the transit time of said detected perturbed wave burst component, which of a plurality of paths was traversed by said touch-perturbed wave burst component and thus determining the location of the touch along said axis of said substrate surface.

2. A touch detection apparatus as in claim 1 wherein said location of the touch is a function of the degree of absorbtion of acoustic energy.

3. A touch detection apparatus as in claim 1 wherein said acoustic waves travel across the surfaces of said primary and secondary substrates.

4. A touch detection apparatus as in claim 1 wherein said acoustic waves travel below the surfaces of said primary and secondary substrates.

5. A touch detection apparatus as in claim 3 wherein said acoustic wave redirecting means includes a reflective array formed integral to said secondary substrate surface for deriving wave burst components from said launched wave burst and redirecting them along a plurality of paths of different lengths which are respectively associated with different positions along said coordinate axis on said first substrate surface, said reflective array having an increasing reflectivity along said paths greater in length to at least partially compensate for the fall-off in wave amplitude with increasing wave path length and attenuation.

6. A touch detection apparatus defined by claim 5 wherein said reflective array has, along said paths greater in length, the density of array elements increased progressively in proportion to effect said increasing reflectivity.

7. A touch detection apparatus defined by claim 5 wherein said reflective array has, along said paths greater in length, the reflectivity of the individual array elements increasing.

8. A touch detection apparatus as in claim 5 wherein said reflective array comprises individual reflectors elements created by steps oriented at an angle in the basic substrate material and formed from one the processes of etching, stamping, molding, plating and screening and firing.

9. A touch detection apparatus as in claim 5 wherein said reflective array comprises individual reflectors elements created by grooves oriented at an angle in the basic substrate material and formed from one the processes of etching, stamping, molding, plating and screening and firing.

10. A touch detection apparatus as in claim 5 wherein said reflective array comprises individual reflector elements oriented at an angle created by causing a different acoustic velocity of the waves between the reflector elements and basic secondary substrate, with reflector elements being formed by one of the processes of etching and filling in conjunction with photo resist, chemical surface treatments, physical surface treatments, plating, and screening and firing.

11. A touch detection apparatus as in claim 1 wherein the first substrate is the physical front surface of a visual display apparatus.

12. A touch detection apparatus as in claim 1 wherein the first substrate is transparent and serves as an optical filter, safety shield, or window in conjunction with a visual display apparatus.

13. A touch detection apparatus as in claim 1 wherein the secondary substrates have different physical properties than the first substrate.

14. A touch detection apparatus as in claim 13 wherein said acoustic waves experience less energy loss while propagating in said secondary substrates than when propagating in said primary substrate.

15. A touch detection apparatus as in claim 14 wherein said secondary substrates are formed from a metallic material selected from the group of aluminum, brass, steel, nickel, chrome, copper, and combinations and alloys thereof.

16. A touch detection apparatus as in claim 1 wherein
said transmitter secondary substrate associated with said output transducer is positioned near but above the said primary substrate, with said substrates substantially face to face, with the launched wave parallel to an axis along the edge of the desired touch detection region and derived wave components directed toward the desired touch detection surface, and
the acoustic coupling means said transmitter secondary substrate to said primary substrate is a coupling material with a width of only a few wavelengths of said acoustic wave, said acoustic coupling means extending along at least the entire length of the desired touch sensitive region and in contact with both the touch sensitive surface of the said primary substrate and surface conducting wave components on said transmitter secondary substrate, and further said coupling material has the property that the bulk longitudinal acoustic wavelength is less than the wavelength of acoustic waves at or near the surface of both the first and secondary substrates, such that said acoustic wave components transverse said desired touch sensitive region of said first substrate at least once.

17. A touch detection apparatus as in claim 16 where said coupling material is selected as one of the group of an acrylic glass such as Plexiglass, an acrylic glass such as Lucite (Polymethyl methacrylate (PMMA), poly(methyl 2-methylpropenoate), an elastomer, rubber, latex, silicone, a grease, and combinations thereof.

18. A touch detection apparatus as in claim 16 wherein, at the coupling regions of a few wavelengths width, the surface of said secondary substrate is formed in said coupling region such that of the surface of said secondary and primary substrates are at a slight angle which facilitates the most efficient transfer of acoustic waves therebetween.

19. A touch detection apparatus as in claim 16 wherein
said coupling material is positioned to completely surrounding and enclosing said wave directing means located on said transmitter secondary substrate associated with an input transducer, and
said coupling material is further positioned to completely surround and enclose said wave directing means located on said receiver substrate associated with an output transducer.

20. A touch detection apparatus as in claim 19 wherein multiple wave directing means and associated coupled output and input transducers are combined into the same secondary substrate that also is formed as a bezel.

21. A touch detection apparatus as in claim 1 wherein
said receiver secondary substrate associated with said input transducer is positioned near but above the said primary substrate, with said substrates substantially face to face, with the received wave derived components parallel to an axis along the edge of the desired touch detection region and wave components received from the direction of the desired touch detection surface, and
the acoustic coupling means said receiver secondary substrate to said primary substrate is a coupling material with a width of only a few wavelengths of said acoustic wave, said acoustic coupling means extending along at least the entire length of the desired touch sensitive region and in contact with both the touch sensitive surface of the said primary substrate and surface conducting wave components on said receiver secondary substrate, and further
said coupling material has the property that the bulk longitudinal acoustic wavelength is less than the wavelength of acoustic waves at or near the surface of both the first and secondary substrates, such that said acoustic wave components transverse said desired touch sensitive region of said first substrate at least once.

22. A touch detection apparatus as in claim 21 where said coupling material is selected as one of the group of an acrylic glass such as Plexiglass, an acrylic glass such as Lucite (Polymethyl methacrylate (PMMA), poly(methyl 2-methylpropenoate), an elastomer, rubber, latex, silicone, a grease, and combinations thereof.

23. A touch detection apparatus as in claim 21 wherein, at the coupling regions of a few wavelengths width, the surface of said secondary substrate is formed in said coupling region such that of the surface of said secondary and primary substrates are at a slight angle which facilitates the most efficient transfer of acoustic waves therebetween.

24. A touch detection apparatus as in claim 21 wherein
said coupling material is positioned to completely surrounding and enclosing said wave directing means located on said transmitter secondary substrate associated with an input transducer, and
said coupling material is further positioned to completely surround and enclose said wave directing means located on said receiver substrate associated with an output transducer.

25. A touch detection apparatus as in claim 24 wherein multiple wave directing means and associated coupled output and input transducers are combined into the same secondary substrate that also is formed as a bezel.

26. A touch detection apparatus as in claim 1 comprising two axes substantially perpendicular to each other including circuitry and analysis for determining at least the location of a touch along the two axis and providing a co-ordinate location.

27. A touch detection apparatus as in claim 1 wherein a material is selected from the group of a ceramic and a glass with a thermal expansion close to that of said primary first substrate and is laminated to the back of said secondary arrays to balance stress forces between said primary and secondary substrates.

28. A system for use with a touch detection apparatus, the system recognizing intentionally touched positions along at least one predetermined axis of the apparatus by recognizing and locating a momentary intentional absorption of acoustic energy in a desired touch sensitive region, the system comprising:
a first substrate, its surface capable of propagating acoustic waves and being so characterized that it is touch sensitive such that a touch on said surface causes a perturbation, in the form of at least a partial absorption of energy, of an acoustic wave propagating through a region of desired touch detection;
at least one input transducer, coupled to a first secondary substrate, which launches a burst of acoustic waves upon that substrate;
at least one output acoustic wave transducer coupled to a secondary substrate that detects received acoustic waves;
at least one wave redirecting means on said secondary substrate which derive wave components separated in time from a launched wave;
a first coupling means disposed between said transmitter secondary substrate and said primary substrate to transfer said wave components to a first edge defining a first axis of the desired touch sensing area of said primary substrate surface; and
a second coupling means disposed between said primary substrate and said receiver secondary substrate to transfer and redirect acoustic waves to the output transducer after propagating across the first surface at least once such that said wave components are caused to traverse said axis along a progression of paths differing in time and associated with different touch positions along the axis; and
circuitry, including computation and communication means, coupled to the input and output transducers which initiates acoustic wave bursts causing derived wave components separated in time across the first substrate surface and detects touch-induced perturbations of the received waves indicative of the location of a touch along the axis, said circuit means including means for determining, by an analysis based on the transit time of the detected perturbed wave burst component, which of said plurality of paths was traversed by the touch-perturbed wave burst component and thus determining the location of the touch along said axis of said substrate surface, and a degree of absorbtion of acoustic energy.

29. A system as in claim 28 wherein said input transducer launches said burst of acoustic waves onto the surface of said first secondary substrate.

30. A system as in claim 28 wherein said input transducer launches said burst of acoustic waves within said first secondary substrate.

31. A system as in claim 28 in which said substrate comprises an isotropic medium.

32. A system as in claim 31 in which said substrate comprises a tablet.

33. A system as in claim 32 in which said tablet is formed on a sheet of glass.

34. A system as in claim 28 in which said substrate comprises the first physically contactable surface of an image display device.

35. A system as in claim 28 for controlling images and associated functions on an image display device corresponding to detected intentional touched positions.

36. A system as in claim 28 for controlling images and associated functions on an image display device corresponding according to detected intentionally touched positions and the degree of absorbtion of acoustic energy during said intentional touch activation.

37. A touch detection apparatus comprising;
- a primary substrate having a surface capable of propagating acoustic waves and being so characterized that said surface is touch sensitive such that a touch on said surface causes a perturbation, in the form of at least a partial absorption of energy, of an acoustic wave propagating through a region of desired touch detection;
- at least one transmitter and receiver secondary substrate mounted along an edge of said primary substrate;
- at least one transducer, coupled to said transmitter and receiver secondary substrate, said transducer operative to launch a burst of acoustic waves onto said transmitter secondary substrate, said transducer also operative to receive reflected acoustic waves;
- a coupling means disposed between said transmitter and receiver secondary substrate and said primary substrate to transfer said wave components to and from a first edge defining a first axis of the desired touch sensing area of said primary substrate surface; and
- at least one reflective means positioned opposite the desired touch sensitive area on the primary substrate opposite from said transmitter and receiver secondary substrate whereby wave components transit the touch sensing area twice; and
- circuitry, including computation and communication means, coupled to the input and output transducer which initiates acoustic wave bursts causing derived wave components separated in time across the first substrate surface and detects touch-induced perturbations of the received waves indicative of the location of a touch along the axis, said circuit means including means for determining, by an analysis based on the transit time of the detected perturbed wave burst component, which of said plurality of paths was traversed by the touch-perturbed wave burst component and thus determining the location of the touch along said axis of said substrate surface, and a degree of absorbtion of acoustic energy.

* * * * *